United States Patent [19]

Schmid

[11] Patent Number: 5,482,327
[45] Date of Patent: Jan. 9, 1996

[54] DEVICE FOR SECURING A GENERALLY CYLINDRICAL GAS GENERATOR CARTRIDGE IN A HOUSING BLOCK OF A SAFETY BELT TENSIONER DRIVE

[75] Inventor: Johannes Schmid, Schwäbisch Gmünd, Germany

[73] Assignee: TRW Repa GmbH, Alfdorf, Germany

[21] Appl. No.: 295,613

[22] Filed: Aug. 25, 1994

[30] Foreign Application Priority Data

Aug. 26, 1993 [DE] Germany ............... 43 28 760.3

[51] Int. Cl.⁶ ........................................... B60R 22/46
[52] U.S. Cl. ................... 280/806; 102/531; 297/480; 403/349
[58] Field of Search ................... 280/806, 728 A, 280/728.2; 297/480; 242/374; 403/349, 348, 350, 342; 102/530, 531

[56] References Cited

U.S. PATENT DOCUMENTS

| 650,184 | 5/1900 | Maddock | 403/349 |
|---|---|---|---|
| 1,217,041 | 2/1917 | Martz | 403/348 |
| 3,879,054 | 4/1975 | Lindblad | 280/806 |
| 3,942,819 | 3/1976 | Schwanz et al. . | |
| 4,690,063 | 9/1987 | Granier et al. . | |
| 4,734,265 | 3/1988 | Nilsson et al. . | |
| 4,789,185 | 12/1988 | Fohl . | |
| 4,927,175 | 5/1990 | Fohl | 280/806 |
| 5,037,134 | 8/1991 | Tabata | 280/806 |
| 5,104,193 | 4/1992 | Fohl . | |
| 5,233,925 | 8/1993 | Fohl | 280/806 |

FOREIGN PATENT DOCUMENTS

| 0059643 | 9/1982 | European Pat. Off. . | |
| 0168588 | 1/1986 | European Pat. Off. . | |
| 0180488 | 5/1986 | European Pat. Off. . | |
| 8621257 | 9/1986 | Germany . | |
| 8914030 | 4/1990 | Germany . | |
| 5193446 | 8/1993 | Japan | 280/806 |
| 2262874 | 7/1993 | United Kingdom | 280/806 |

*Primary Examiner*—Margaret A. Focarino
*Assistant Examiner*—Peter C. English
*Attorney, Agent, or Firm*—Tarolli, Sundheim & Covell

[57] ABSTRACT

For securing a generally cylindrical gas generator cartridge (14) in the housing block (10) of a belt tensioner drive unit the housing block is provided with a bore (12) in which the gas generator cartridge (14) is inserted. On the outer head portion (14a) of the gas generator cartridge incorporating an electric igniter a sleeve (18) is fitted which has at its axial end a radially inwards oriented flange (20) adjacent the end surface of the gas generator cartridge (14). At its opposite axial end the sleeve (20) is provided with rims (22) oriented radially outwards which permit insertion in the bore (12) by axial guide channels (12a, 12b) so that when the sleeve (18) is rotated in a prescribed sense of rotation the rims (22) engage in a groove (28) provided circumferentially in the bore, the guide channels (12a, 12b) merging in the groove (28).

4 Claims, 2 Drawing Sheets

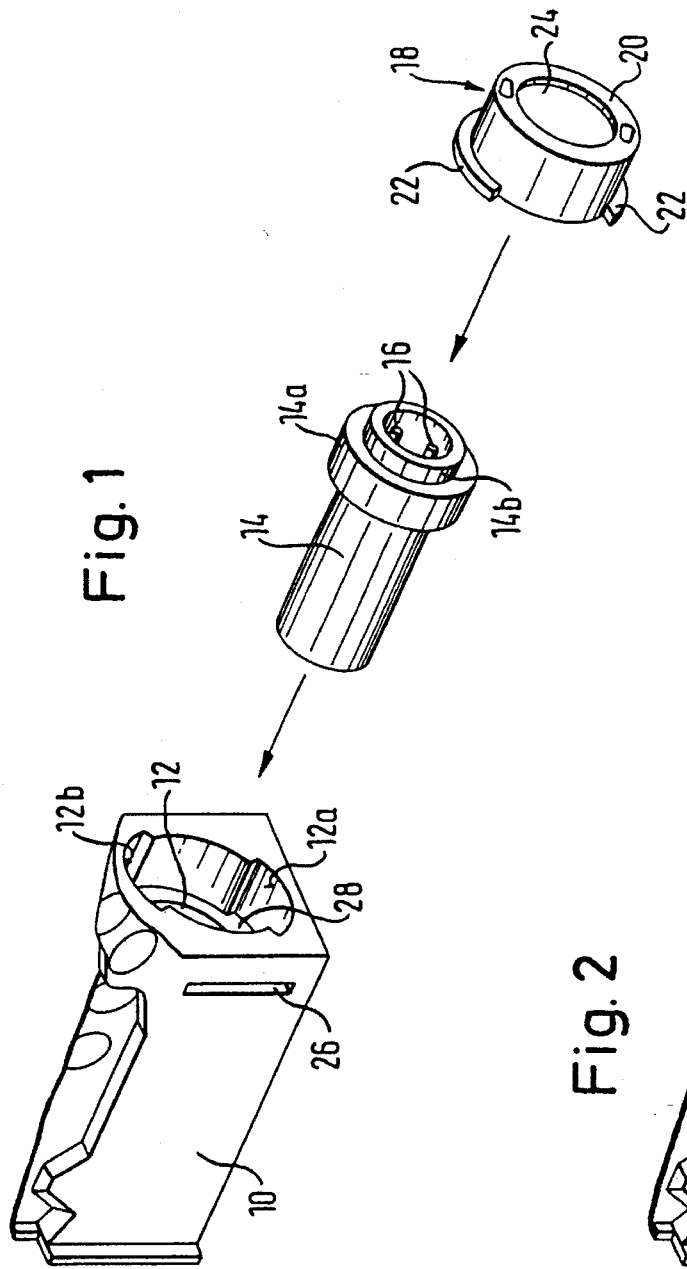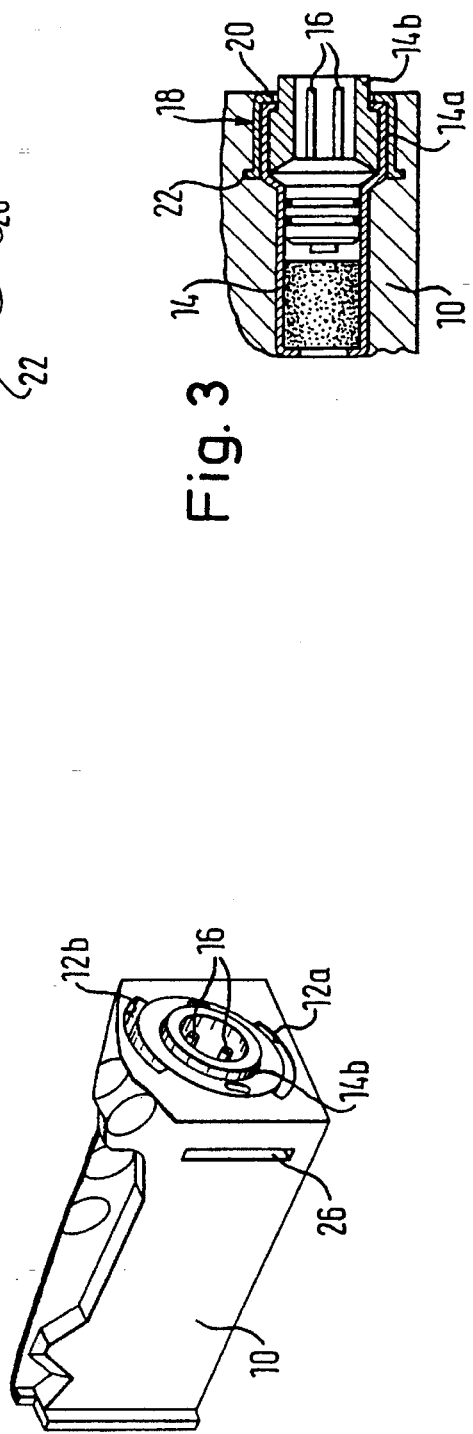

DEVICE FOR SECURING A GENERALLY CYLINDRICAL GAS GENERATOR CARTRIDGE IN A HOUSING BLOCK OF A SAFETY BELT TENSIONER DRIVE

The invention relates to a device for securing a generally cylindrical gas generator cartridge in a housing block of a safety belt tensioner drive unit of a vehicular restraining system.

Gas generator cartridges for belt tensioner drive units in vehicular restraining systems have a generally cylindrical housing incorporating an elongated main body, in which the propulsion charge is accommodated, and a widened head portion which is provided with an electric igniter and electric contact pins for connecting a connector plug. Since the shape and size of the housing of the gas generator cartridge are more or less standardized, the apparatus for securing the gas generator cartridge in a housing block of the belt tensioner drive unit must comply with these standards.

For obvious safety reasons fitting the gas generator cartridge is one of the last steps in the production of the belt tensioner drive unit. The mechanical requirements on securing the gas generator cartridge in the housing block of the drive unit are very high, since at the moment of igniting the gas generator it is required to withstand extremely high axial forces. This is why prior art practiced riveting the housing of the gas generator cartridge or providing a connector with a clip and a recess in the housing of the gas generator cartridge, whereby preference was given to the riveting method as compared to the complicated connector arrangement. However, the prerequisite for practicing of the riveting method is that the housing of the gas generator cartridge consists of a material suitable for riveting, this eliminating the use of such materials as aluminum-magnesium alloys or forming the housing of the gas generator cartridge as an injection molding of plastic with their advantages for production engineering and as regards the costs involved.

The present invention provides a device for securing a gas generator cartridge in the bore of a housing block necessitating no change to the shape and size of a conventional gas generator cartridge and requiring no rivet connection.

According to the invention, a device for securing a generally cylindrical gas generator cartridge in a housing block of a safety belt tensioner drive is provided. The housing has a bore for accommodation of the gas generator cartridge. The gas generator cartridge has a first axial end provided with a gas outlet and a second axial end provided with an igniter. The device comprises a sleeve fitting around the second cartridge end and having a radially inwardly extending flange on a first end and at least one radially outwardly extending rim on a second end. The bore is provided with an axially extending recessed channel and a shoulder formed by a peripheral groove in the bore. The channel opens into the groove and the rim is shaped for passing through the channel upon fitting of the sleeve over the second cartridge end after insertion of the cartridge into the bore, and for engagement behind the shoulder upon rotation of the sleeve. For reliably securing the gas generator cartridge in the housing block of the drive unit only a single part is needed which can be produced at low cost, namely the sleeve which is simply fitted on the gas generator cartridge to be inserted in the bore of the housing block and then locked in place by bayonet lock-type rotation. Contrary to the conventional riveting method there is practically unlimited freedom in arranging the gas generator cartridge in the housing block of the drive unit, since there is now no need for the housing block to be supported with high loading capacity, nor is access for a dopper in riveting needed. The securing device according to the invention lends itself also to automated assembly with subsequent inspection.

In one advantageous embodiment of the securing device each of the rims on the sleeve describes a section of a helix coaxial with the envelope surface of the sleeve, and the groove forms a shoulder extending perpendicularly to the axis of the bore for engagement by the rims, providing axial support for the sleeve, the rims are designed to slope upwards to ensure clamping of the sleeve on the housing block. Return rotation of the clamped sleeve is hardly possible since the edges of the rims bite into the shoulder surface of the groove, so that notches are formed which act as latching edges. The gas generator cartridge is thus locked against loosening in the bore of the housing block just as with a riveted joint.

To facilitate automated assembly the radially inwards oriented flange of the sleeve in a further advantageous embodiment is provided with at least two openings which are defined in the direction of a prescribed sense of rotation by a semi-cylindrically shaped surface and in the opposite direction by a ramp surface sloping upwards from the bottom of the opening. In these openings an assembly tool having two pins can be caused to engage so that these pins come into contact with the semi-cylindrically shaped surfaces when rotation is in the prescribed sense. By means of the assembly tool a high torque can be exerted on the sleeve, whereas in the opposite sense of rotation no transfer of torque to the sleeve is possible, due to the pins of the assembly tool disengaging from the upwards sloping ramp surfaces. Accordingly, this makes it considerably difficult for the gas generator cartridge to be disassembled without authority.

Further features and advantages of the invention will be appreciated from the following description of an embodiment and from the drawing to which reference is made and in which:

FIG. 1 is an exploded view in perspective of part of the housing block of a drive unit, a gas generator cartridge and a sleeve for defining the latter in the housing block;

FIG. 2 is an analog view in perspective, showing the parts in the assembled condition;

FIG. 3 is an axial section through the gas generator cartridge defined in the housing block;

Figure 4:
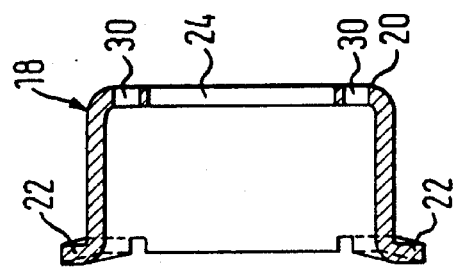
FIG. 4 is a section along the line IV—IV in FIG. 6.
Figure 5:
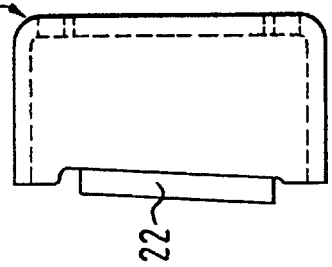
FIG. 5 is a side view of the sleeve shown in FIG. 4.

In FIGS. 1 and 2 part of a housing block 10 of a belt tensioner drive unit of a vehicular restraining system is shown. In this housing block 10 a generally cylindrically shaped bore 12 is formed into which a gas generator cartridge 14 is suitably insertable. The gas generator cartridge 14 is provided at its inner end with a blowout plate located opposite the end of a gas guidance channel formed within the housing block 10. In the tubular main section of the gas generator cartridge 14 a pyrotechnical propellant is contained. At the outer end of the gas generator cartridge 14 a head portion 14a of enlargened diameter is formed. This head portion 14a contains an electric igniter and electric connecting pins 16 for connecting a connector plug (not shown). A cylindrical sleeve 18 is provided at its one axial end with a radially inwards oriented ring flange 20 and at its opposite end with two rims 22 arranged diametrically opposed to each other which are oriented radially outwards. From the head portion 14a a socket 14b projects axially which—when the sleeve 18 is mounted on the head portion 14a of the gas generator cartridge 14—engages in a circular opening 24 surrounding the ring flange 20. When the sleeve 18 is introduced into the bore 12 the rims 22 of the sleeve 18 are guided by axially recessed channels 12a, 12b of this bore. In its outer part corresponding to the head portion 14a the bore 12 is expanded to a diameter corresponding to the outer diameter of the head portion 14a plus twice the wall thickness of the sleeve 18. By means of the nick 26 in the side of the housing block a groove 28 is provided circumferentially in the wall of the bore 12. The guide channels 12a, 12b merge in this groove 28. The remaining sections of the wall between the guide channels 12a, 12b form together with their end bordering the groove 28 an abutment surface oriented vertical to the axis of the bore 12 for the rims 22 of the sleeve 18. These rims 22 each follow a slightly rising helix coaxial to the envelope surface of the sleeve.

Figure 6:
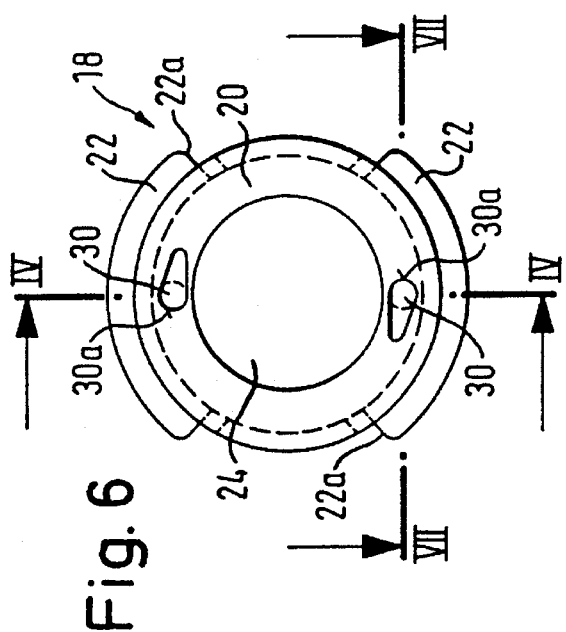
FIG. 6 is a plan view of the front end of the sleeve shown in FIGS. 4 and 5.

For assembly, the gas generator cartridge 14 is inserted into the bore 12, until the radial shoulder formed by the transition from the main section to the head portion 14a abuts a step in the bore 12 forming the transition to the groove 28, the sleeve 18 then being pushed onto the head portion 14a of the gas generator cartridge 14, the rims 22 being guided by the guide channels 12a, 12b. The sleeve 18 is then rotated counterclockwise, causing its rims 22 to engage in the groove 28. With continued rotation with increasing force the rims 22 become supported by the shoulder surface that defines the groove 28 between the guide channels 12a, 12b adjacent the bore 12. Due to the upward slope of the rims 22 the supporting forces become a maximum at the ends 22a of the rims 22 as located at the rear in the direction of rotation (FIG. 6). Rotating of the sleeve 18 in the reverse direction is not possible due to the edges at the ends 22a of the rims 22 biting into the shoulder surface of the groove 28, thereby forming a notch acting as a latching edge.

Figure 7:
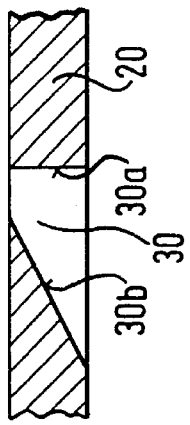
FIG. 7 is a section along the line VII—VII in FIG. 6.

To facilitate assembly the sleeve 18 is provided with engagement openings 30 in its ring flange 20. These engagement openings 30 are located diametrally opposed to each other and are defined on the side located to the front of the sleeve 18 in its direction of rotation by a semi-cylindrical surface 30a and at its opposing side by a ramp surface 30b sloping upwards to the outer surface of the ring flange 20 (FIG. 7). It is into these engaging openings 30 that two cylindrical pins of an assembly tool are inserted. When turned in the prescribed sense of rotation these pins engage the semi-cylindrical surface 30a so that torque is transmitted to the sleeve 18. When turning is attempted in the opposite sense of rotation the pins are rejected away from the upwards sloping ramp surface 30b so that reverse rotation of the sleeve 18 is not possible, thus safeguarding the gas generator cartridge 14 against unauthorized disassembly.

The rims 22 may be formed on the envelope of the sleeve 18, as is evident from FIG. 4, and made to cover a circumferential angle of almost 90°. The axial forces generated on ignition of the gas generator cartridge 14, which the sleeve 18 is required to withstand, are transmitted by the rims 22 over a large surface to the housing block 10 via the shoulder surfaces of the groove 28. The securing device described is thus capable of also withstanding the very high axial forces resulting when the gas generator cartridge 14 is ignited.

What is claimed is:

1. A device for securing a generally cylindrical gas generator cartridge in a housing block of a safety belt tensioner drive, said housing block having a bore, said gas generator cartridge being located in said bore and said gas generator cartridge having a first axial end provided with a gas outlet and a second axial end provided with an igniter, and comprising a sleeve fitting around said second cartridge end and having a radially inwardly extending flange on a first end and at least one radially outward extending rim on a second end, said bore being provided with an axially extending recessed channel and a shoulder formed by a peripheral groove in said borer said channel opening into said groove and said rim having a shape congruent with said channel for permitting passage of said rim through said channel upon fitting of said sleeve over said second cartridge end after insertion of said cartridge into said bore, and said rim extending behind said shoulder subsequent to rotation of said sleeve.

2. The device of claim 1, wherein said rim is formed as a section of a helix around said sleeve.

3. The device of claim 1, wherein said rim is a first rim and said sleeve comprises a second radially outward extending rim, said second rim extending behind said shoulder subsequent to rotation of said sleeve.

4. The device of claim 1, wherein said radially inwardly extending flange of said sleeve has at least two axially extending openings each defined by a semi-cylindrical surface portion in one peripheral direction and by a ramp surface portion in the opposite peripheral direction, said ramp surface portion sloping upwardly from a bottom portion of said opening.

\* \* \* \* \*